(12) United States Patent
Talwar et al.

(10) Patent No.: US 7,774,457 B1
(45) Date of Patent: Aug. 10, 2010

(54) RESOURCE EVALUATION FOR A BATCH JOB AND AN INTERACTIVE SESSION CONCURRENTLY EXECUTED IN A GRID COMPUTING ENVIRONMENT

(75) Inventors: Vanish Talwar, Palo Alto, CA (US); Sujoy Basu, Menlo Park, CA (US); Raj Kumar, Los Atos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1440 days.

(21) Appl. No.: 11/090,714

(22) Filed: Mar. 25, 2005

(51) Int. Cl.
*G06F 15/16* (2006.01)
*G06F 15/173* (2006.01)
*G06F 15/177* (2006.01)

(52) U.S. Cl. ............... 709/224; 718/102; 718/103; 709/203; 709/217

(58) Field of Classification Search ......... 709/200–203, 709/217–228; 718/102, 103
See application file for complete search history.

(56) References Cited

U.S. PATENT DOCUMENTS

2008/0155550 A1* 6/2008 Tsafrir et al. ............... 718/103
2008/0168451 A1* 7/2008 Challenger et al. .......... 718/102

OTHER PUBLICATIONS

"A Resource Allocation Architecture with support for Interactive Sessions in Utility Grids", 2004 IEEE, International Symposium on Cluster Computing and the Grid, pp. 731-734, Nahrstedt et al., Apr. 2004.*

"Architecture for Resource Allocation Services supporting Interactive Remote Desktop Sessions in Utility Grids", Middleware 2004 Companion, pp. 23-29, Nahrstedt et al., Oct. 2004.*

Nabrzyski, J. et al., "Grid Resource Management, State of the Art and Future Trends", Kluwer Academic Publishers, Sep. 2003, p. 15-23, 135-183.

Basu. S et al - "Interactive Grid Architecture for Application Service Providers" - HP Laboratories Palo Alto, HPL-2003-84, Jul. 2003- pp. 1-8.

Dwoskin, J et at - "Scraping Security issues for Interactive Grids" - HP Laboratories Palo Alto -HPL-2003-227, Nov. 2003 - pp. 1-8.

Friedrich, M et al - "Stochastic Resource Prediction and Admission for Interactive Sessions on Multimedia Servers" - Proc of 8th ACM conference on Multimedia (ACM-MM) - Oct. 2000 - pp. 117-126.

Hlavacs, H at al - "Modeling User Behavior: A Layered Approach" -Mascots - Oct. 1999 - pp. 1-8.

Kumar, R at el - "A Resource Management Framework for Interactive Grids" - HP Laboratories Palo Alto - HPL-2D08-85m- Jul. 2003 - pp. 1-80.

Nieh, J et al - "Measuring Thin-Client Performance Using Slow-Motion Benchmarking"- ACM Transactions on Computer Systems, vol. 21 No. 1 - Feb. 2003- pp. 87-115.

Richardson, T et al - "Virtual Network Computing"- IEEE Internet Computing, vol. 2 No. 1 - Jan/Feb 1995 - pp. 33-38.

(Continued)

*Primary Examiner*—Haresh N Patel (57) ABSTRACT

A method of allocating resources in a grid computing environment is provided. The method includes allocating resources for concurrently executing a batch job and an interactive session.

21 Claims, 7 Drawing Sheets

OTHER PUBLICATIONS

Rolia, J at at - "Grids for Enterprise Applications" - Workshop on Job Scheduling Strategies for Parallel Processing - Jun. 2003 - pp. 1-45.

Schmidt, B et al. - "The Interactive Performance of SLM: A Stateless, Thin-Client Architecture" -17th ACM Symposium on Operating System Principles (SOSP'99 - Dec. 1999 - pp. 32-47.

Urgaonkar, B et al - "Resource Overbooking and Applications Profiling in Shared in Hosting Platforms" - OSDI 2002 - Dec. 2002 - pp. 1-16.

Wong, A et al - "Evaluating Windows NT Terminal Server Performance"- Proceedings of the 3rd USEN1X Windows NT Symposium - Jul. 1999 - pgs. 1-11.

Yang, S et al - The Performance of Remote Display Mechanisms for Thin-Client Computing - 2002 USENIX Annual Technical Conference -Jun. 2002 - pp. 1-16.

CITRIX - http://www.citrix.com/ - downloaded Mar. 24, 2005 - p. 1.

HP Process Resource Manager - http://www.hp.com/products1/unix/operating/prm - downloaded Mar. 24, 2005 - pp. 1-2.

Real VNC - http://www/realvnc.com/ - downloaded Mar. 24, 2005 - pp. 1-2.

Haring. G -"On Stochastic Models of Interactive Workloads" - North-Holland Publishing Company - May 1983 - pp. 1-10.

"Windows 2000 Terminal Services Capacity and Scaling" - Microsoft Windows 2000 Server - Microsoft Corp, Redmond WA - copyright 2000 - pp. 1-42.

* cited by examiner

RESOURCE EVALUATION FOR A BATCH JOB AND AN INTERACTIVE SESSION CONCURRENTLY EXECUTED IN A GRID COMPUTING ENVIRONMENT

TECHNICAL FIELD

The technical field relates to allocating resources in a grid computing environment. More particularly, the technical field relates to allocating computer resources for concurrently executing both a batch job and an interactive session.

BACKGROUND

Grid computing is a form of computer networking. Whereas conventional computer networks focus on communication between devices, grid computing typically harnesses the processing power of multiple computers within a network, and can be used for solving problems which are too intensive for a stand-alone machine. Grid computing also involves the sharing of computer resources. A single computer user whose normal requirements for computer processing power are fairly minor may occasionally have more substantial needs, and the existence of a computer grid enables the user to use external computer resources for a period of time.

Conventionally, grid computing environments are used for computational intensive applications, such as for weather forecasting, molecular biology studies involving millions of molecules, and financial risk analysis tools. These applications are submitted as batch jobs that typically do not require user interaction after the applications are submitted. Resource on demand environments are starting to be utilized in a more comprehensive manner, such as in a data center for executing a large variety of applications. These resource on demand environments can efficiently allocate resources as needed. However, these environments also typically support batch jobs. Thin clients are becoming increasingly popular as a way to manage user applications. Thin clients are typically connected to one or more servers that run all the user applications and support remote desktop sessions with the users. However, the servers may not be provided in a resource on demand environment, and thus may be unutilized at times, such as during off-peak times.

SUMMARY

An embodiment of a method of allocating resources in a grid computing environment includes receiving at least one request for a batch job and receiving at least one request for an interactive session. The method also includes determining computer resources needed for concurrently executing the batch job and the interactive session, and allocating the computer resources for concurrently executing both the batch job and the interactive session.

BRIEF DESCRIPTION OF THE DRAWINGS

Embodiments are illustrated by way of example and not limitation in the accompanying figures in which like numeral references refer to like elements, and wherein.

DETAILED DESCRIPTION OF THE EMBODIMENTS

For simplicity and illustrative purposes, the principles of the embodiments are described. However, one of ordinary skill in the art would readily recognize that the same principles are equally applicable to, and can be implemented with variations that do not depart from the true spirit and scope of the embodiments. Moreover, in the following detailed description, references are made to the accompanying figures, which illustrate specific embodiments.

Figure 1:
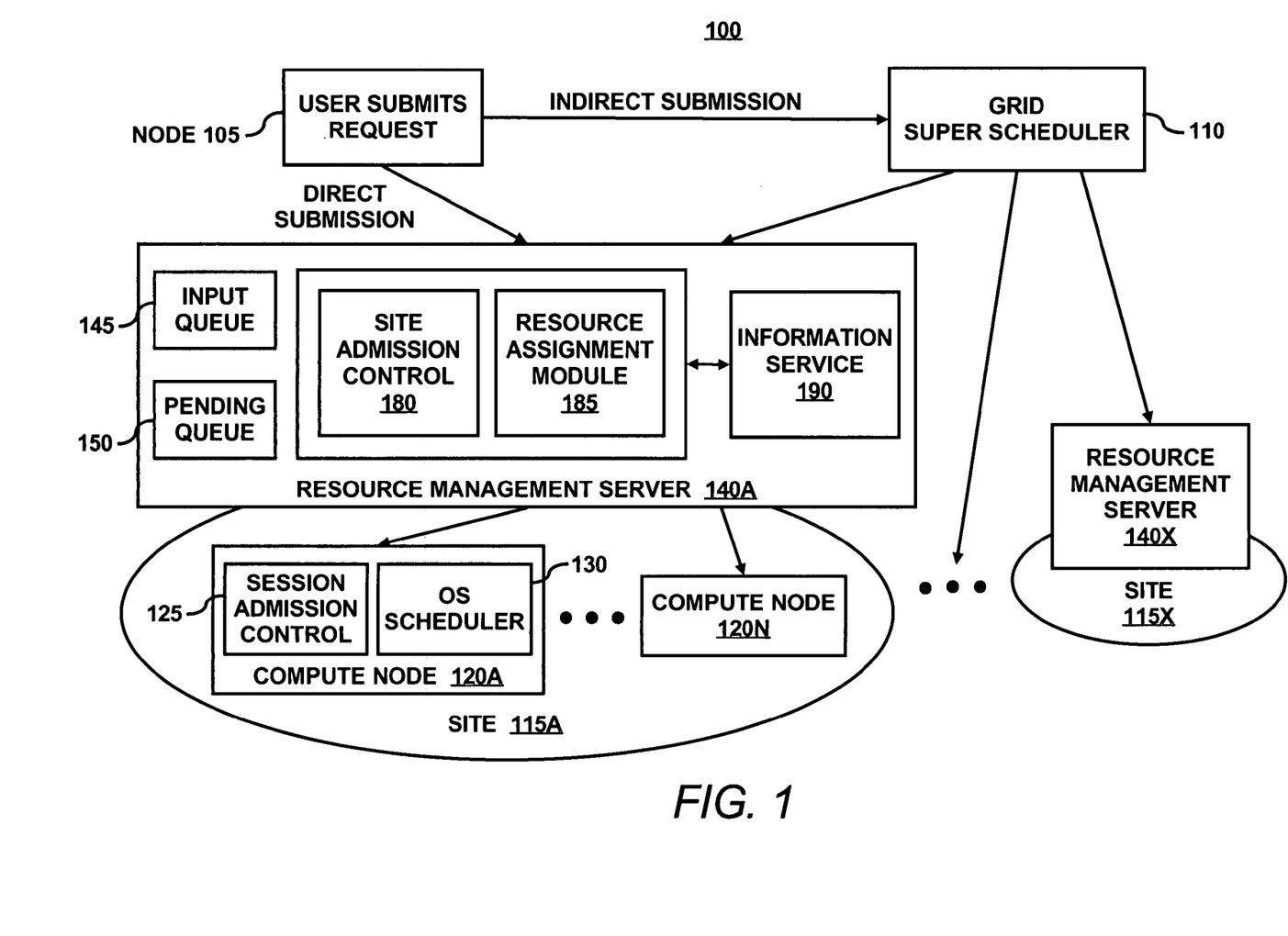
FIG. 1 depicts an operating environment of a grid computing system, according to an embodiment.

Referring to FIG. 1, a diagram of an operating environment of a grid computing system 100 is shown. The grid computing system 100 may include any distribution of computing resources that may be accessed by an end-user. For example, the system 100 may include a plurality of geographically distributed resources.

The grid computing system 100 may include a plurality of data centers that provide a shared pool of computer resources. The plurality of data centers may include any number of data centers on any scale. In addition, the data centers may be public, private, or a combination of public and private data centers. The shared pool of resources may comprise resources that are distributed across a wide geographic area. The shared pool of resources may also comprise heterogeneous resources from the plurality of data centers. In addition, the resources may be shared by several users, either at different times or simultaneously.

The system 100 includes at least one submission node 105 in which an end-user submits a request for utilizing grid computing resources. The submission node 105 may comprise a computing device. For example, the computing device may include a thin client machine operated by an end-user, any public or private computer terminal connected to a network, or any other known type of computing device. An end-user may desire interactive access in the form of interactive sessions with one or both of a public or private machine, or one or both of a plurality of public or private machines, each machine having resources accessible within a grid computing environment. For an interactive session, keyboard and mouse events may be submitted by a user from the submission node 105 to one or more compute nodes 120A, 120N, etc., within a grid. A remote display may then be sent from a compute node 120A, for example, to the user's submission node 105.

The grid computing system 100 also includes a plurality of sites 115A-115X. Each site 115A-115X may comprise a data center site operated, for example, by a public or private entity, such as an application service provider or a corporate in-house information technology department. Each of the sites 115A-115X may include a plurality of compute nodes 120A, 120N, etc. Each compute node 120A, 120N, etc., may provide computer resources for running one or more mixed workloads or applications, for example, during a remote desktop session. A remote desktop session, also referred to as an interactive session, may include any session in which a user interacts with one or more applications hosted by one or more compute nodes. For example, a user in a thin client environment may launch one or more applications that require user interaction during a remote desktop session.

According to an embodiment, the system 100 may provide resource allocation for executing one or more mixed workloads, for instance, workloads that provide for simultaneously running one or more batch jobs and interactive sessions in a grid computing environment. The system 100 may include a resource allocation architecture that utilizes the same set of computer resources to concurrently run an interactive session and a batch job.

Batch jobs and interactive sessions may run on any single compute node or on any number of different compute nodes, and in any order of execution, including concurrently executing batch jobs and interactive sessions on the same compute or different compute nodes or sequentially executing batch jobs and interactive sessions. In one example, one or more batch jobs and interactive sessions run concurrently on the same compute node, for instance, the compute node 120A. In another example, one or more batch jobs may run on the compute node 120A while, simultaneously, one or more interactive sessions run on a separate compute node, such as the compute node 120N.

Batch job execution in a grid computing environment may involve any process that is executed by one or more backend services without user interaction, for example one or more remote compute nodes 120A, 120N, etc. For example, an end-user may submit a request that is executed as a batch job. When the batch job begins, processing may continue until it is completed, without input or interaction by a user. Once the batch job request is submitted by the end-user, a compute node, such as the remote compute node 120A, is assigned to execute the batch job. In executing the batch job, the compute node 120A may run an application to execute the batch job without further user input or involvement. For instance, a print job command submitted by a user at submission node 105 may be executed entirely by the remote compute node 120A, without further input by the end-user. The remote compute node 120A may also communicate with one or more other compute nodes, such as compute node 120N, etc., within the system 100 to execute a batch job.

Resources are also allocated for interactive sessions. The system 100 may utilize a hierarchical session architecture for establishing an interactive session. A hierarchical session architecture may comprise a global interactive session and one or more per-application interactive sessions.

A global interactive session may constitute an association between an end-user using the submission node 105 and a remote compute node 120A, 120N, etc., wherein the end-user using the submission node 105 interacts with the remote compute node 120A, 120N, etc., to launch one or more applications. One example of a global interactive session is a virtual network computing (VNC) remote display session wherein the graphical desktop of a remote node, such as the compute node 120A, is exported, for example, to the computer terminal of an end-user using the submission node 105. A global interactive session may be established for graphical applications, but may also occur with text-only applications or any other desired interface. The resource allocation architecture of system 100 may allocate grid computing resources for executing at least one global interactive session simultaneously with at least one batch job.

After a global interactive session is established, an end-user may subsequently interact with the launched applications through one or more per-application sessions. A per-application interactive session for an application executing on a remote compute node, such as the compute node 120A, may include an association between an end-user and an executing application wherein the end-user interacts directly with the application. A per-application interactive session may occur in the context of a global interactive session. A per-application interactive session may include interaction with a graphical application, but may also include interaction with text-only applications or any other desired interface. Application sessions may be established to utilize applications provided by application service providers (ASPs) or by in-house corporate departments, for example. Examples of applications in such environments include CAD/CAM applications, office applications, and financial applications.

With reference to FIG. 1, a user may, from the submission node 105, submit a request either directly or indirectly for establishing a global interactive session with one of a plurality of sites 115A-115X. A user may submit a request for establishing a global interactive session indirectly using a grid super scheduler 110. The grid super scheduler 110 is capable of scheduling user requests across a plurality of different sites 115A-115X. Alternatively, a user request may be submitted directly to a plurality of sites 115A-115X.

Whether a request for a global interactive session is submitted directly or indirectly by a user from the submission node 105, the user's request is received by a resource management server, such as the resource management server 140A, within the data center site 115A. Each of the sites 115A-115X includes, in addition to one or more compute nodes 120A, 120N, etc., a corresponding resource management server 140A-140X. The resource management server 140A schedules one or more global interactive sessions across one or more of a plurality of corresponding compute nodes 120A, 120N, etc. In addition, each resource management server 140A-140X may include at least one or more of an input queue 145, a pending queue 150, a site admission control module 180, and a resource assignment module 185. Each resource management server 140A-140X may also include at least one information service module 190.

User requests that are received by the resource management server 140A are placed in the corresponding input queue 145. Upon arrival of each user request, coarse grain filtering or any other suitable filtering method may be used in determining which of the plurality of compute nodes 120A, 120N, etc., to assign to each request. The filtering process allows for optimization of resource allocation based on the computing requirements, also referred to as the computing needs, of each request for a global interactive session. For instance, filtering of the plurality of compute nodes 120A, 120N, etc., within each of the sites 115A-115X may be based on one or more static resource requirements for scheduling each global interactive session. The static resource requirements may include, for example, the desired processor speed and type, the desired memory size, etc. Other heuristic approaches or methods may also be utilized for determining the resource requirements for each request for a global interactive session.

The assignment of each request for a global interactive session to one or more compute nodes 120A, 120N, etc., that satisfy the filtering requirements is performed by a site admission control module, such as the site admission control module 180, within each corresponding resource management server 140A-140X. If none of the compute nodes 120A, 120N, etc., satisfy the filtering requirements for a global interactive session request, then the request is placed in a pending queue 150. A request placed in the pending queue 150 may be resubmitted at a later time for assignment to one or more of the compute nodes 120A, 120N, etc. when resources become available.

When one of the plurality of compute nodes 120A, 120N, etc., is identified as satisfying the computing requirements, or the computing needs, for a global interactive session request, the resource assignment module 185 selects the identified compute node 120A, 120N, etc., for receiving the request. Once the identified compute node 120A, 120N, etc., is assigned to a request, deployment infrastructure within the corresponding resource management server 140A may perform configuration steps, for example, a setup of the user's data and any required applications at the identified compute node, such as the compute node 120A. The site admission control module 180 and the resource assignment module 185 may communicate with one or more information service modules, such as the information service module 190, in determining which compute node 120A, 120N, etc., to assign a request. The information service module 190 may provide information that may be utilized in determining where to assign a user request, including information about the resource capabilities of a particular compute node 120A, 120N, etc.

Once the required configurations are performed, the global interactive session may begin, and the user may gain direct control of the identified compute node, for instance, the compute node 120A. At this stage, the user may submit one or more requests for per-application interactive sessions directly to the identified compute node 120A through the session admission control module 125. The session admission control module 125 may be implemented in a middleware stack or in another suitable manner. One or more criteria may be employed by the session admission control module 125 to determine if a request for a per-application interactive session can be handled by the compute node 120A at any particular time. If the identified criteria are satisfied for the session admission control test, then the requested application, for example, may be started in the context of the global interactive session. Criteria for establishing a per-application interactive session may include, for example, evaluating resource requirements for the at least one application session, including at least one of CPU utilization, network bandwidth, storage bandwidth, and network latency requirements. The session admission control module 125 thus evaluates whether to admit a per-application interactive session by a compute node, such as the compute node 120A. The session admission control module 125 may also enforce quality of service (QoS) guarantees, including service-level agreements (SLAs), which may be specified for per-application interactive sessions. The SLAs may also be specific to each type of application.

In addition, within the identified compute node 120A, the operating system scheduler (OS scheduler) 130 schedules per-application sessions for the local processor. For instance, the OS scheduler 130 may be used for scheduling one or more applications to be run by a processor in a computer system. In one example, if the session admission control module 125 determines that an application may be started by the compute node 120A, a request is submitted by the session admission control module 125 to a local OS to start the application. In response to submitting the request, information may be provided by the local OS, including information about application programming interface (API) requirements for different applications. After the local OS processes the request, the local OS transmits the request to the OS scheduler 130 for scheduling the application for execution on the local processor.

An OS scheduler, such as the OS scheduler 130, may operate in a similar manner for each corresponding compute node 120A-120N, within each corresponding site 115A-115X. The OS scheduler 130 may schedule one or more per-application sessions based on the evaluation of resource requirements, including at least one or more of CPU utilization, network bandwidth, storage bandwidth, and network latency requirements.

During each per-application session, resource management monitoring agents may be used to monitor global interactive session and per-application session resource utilization values. The monitored data may be aggregated by aggregator agents. Enforcement agents may use this data to enforce quality of service requirements. In addition, an application predictor system may use the aggregated data to predict application behavior.

Thus, referring to FIG. 1, a distributed resource management framework may be distributed across the submission node 105, the compute nodes 120A, 120N, etc., and the resource management server 140A within the corresponding site 115A.

The resource management server 140A may also admit batch jobs. For example, the resource management server 140A determines the computing requirements, or the computing needs, for a batch job and selects one or more of the compute nodes 120A through 120N for executing the batch jobs. The computing requirements may be predicted based on a historical analysis of running the batch job and based on user requirements. Thus, the resource management server 140A is operable to determine the computing requirements, or the computing needs, of a batch job and an interactive session, and allocate computer resources in one or more data centers managed by the resource management server 140A such that the batch job and the interactive session are executed concurrently. In addition, the grid super scheduler 110 is also operable to send requests for batch jobs and interactive sessions to different resource management servers, such as resource management servers 140A and 140 X. In this example, the computing requirements for the batch jobs and the interactive sessions are determined by different resource management servers 140A and 140X. Also, computing resources from different data centers are allocated. For example, if the resource management server 140A receives the batch requests, computing resources managed by the resource management server 140A are allocated for the batch jobs. If the resource management server 140X receives the interactive session requests, computing resources managed by the resource management server 140X are allocated for the interactive sessions.

One example of an admission criterion for the admission of a batch job is a requirement that the CPU utilization available for the batch job meets a minimum threshold. The minimum threshold value may, for instance, correspond to a 35% CPU utilization for executing the batch job a 2 GHz local computer. The minimum threshold value may also include any other percentage of CPU utilization. The minimum threshold value required for admission of the batch job may be determined through any suitable application profiling techniques. Other admission criteria may also be evaluated for the admission of a batch job.

Figure 2:
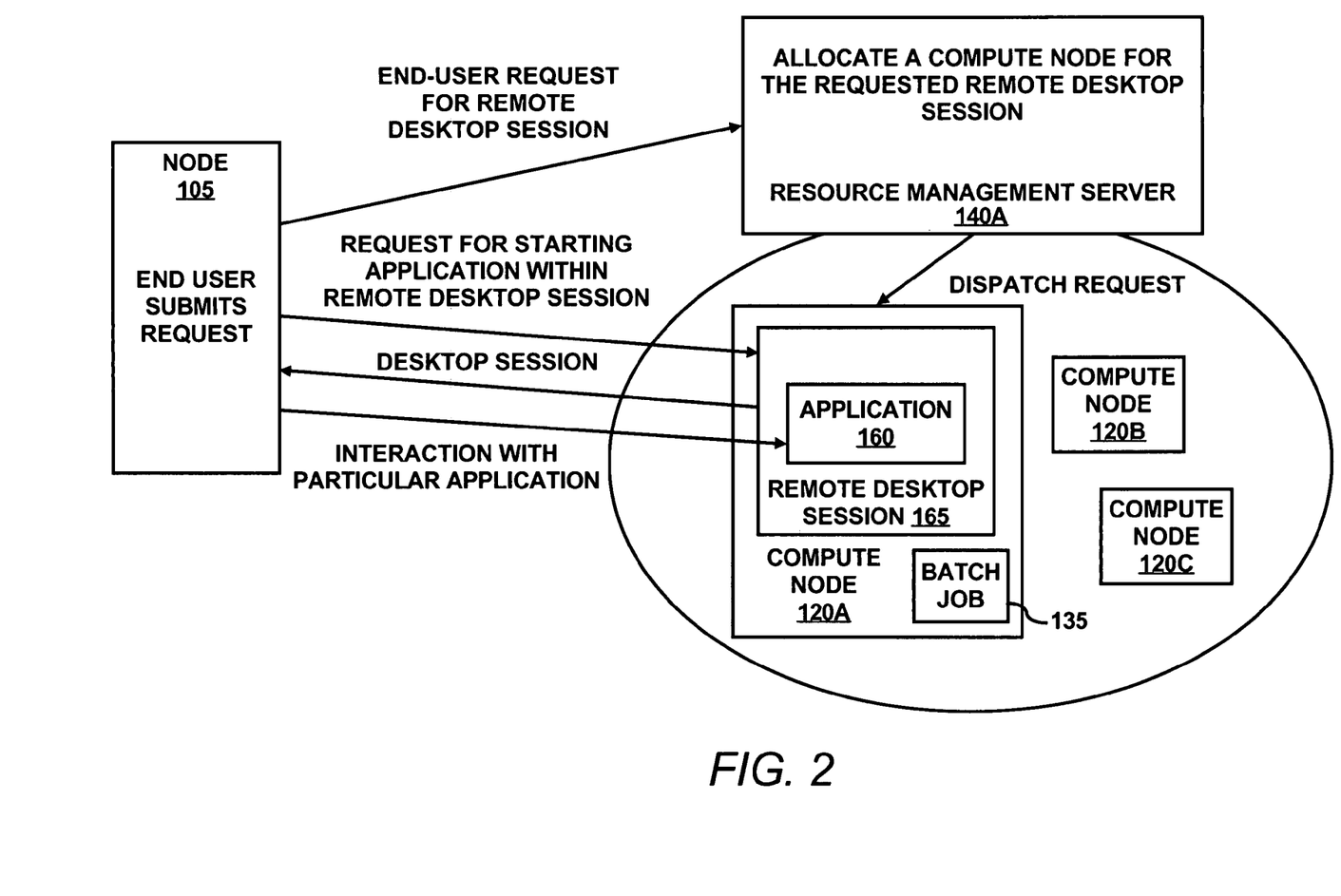
FIG. 2 depicts a system for allocating grid computer resources, according to an embodiment.

Referring to FIG. 2, according to an embodiment, an end-user may submit a request from the submission node 105 for interactively launching one or more applications 160 through a remote desktop session 165 using the resources of one or more compute nodes, for instance, the compute node 120A. The remote desktop session 165, as one example of an interactive session, may include any session in which a user interacts with one or more applications hosted by one or more compute nodes. For example, a user in a thin client environment may launch one or more applications 160 that require user interaction during the remote desktop session 165.

Once a per-application session has been established, as described above with reference to FIG. 1, the interaction between the user and the remote desktop session 165 may be controlled through one or more of a shell, a controlled desktop, and one or more management agents. The controlled shell, desktop, and management agents may be utilized to monitor the interaction with the application 160, and may be driven through one or more authorization policies, for instance, one or more access control lists.

Authorization policies may be utilized, for example, to specify one or more of an allowed list of executables, files, network interfaces, and IP addresses for a particular global session. Assignment of the global interactive session, as described above with reference to FIG. 1, may also be subject to CPU and network bandwidth requirements for the session.

Referring to FIG. 2, after a user submits a request for the remote desktop session 165, also referred to as an interactive session, from the submission node 105, a global interactive session may be established by exporting a desktop environment of a remote resource, such as the compute node 120A, for a certain period of time. Through such a desktop environment, the user can launch one or more applications, for instance the application 160, and may interact with the application 160. These interactive operations may also be performed utilizing one or more of a command line shell, through icons on the desktop of the remote desktop session 165, or any other suitable execution process. In addition, the interactive operations between the user and the remote desktop session 165 may be performed, as described in detail above, through assignment of a global interactive session for a remote desktop environment, and through assignment of one or more per-application interactive sessions within the global interactive session. As described above, with reference to FIG. 1, FIG. 2 shows schematically steps that are involved in interacting with the remote desktop session 165, including an end-user request for the remote desktop session 165, also referred to as an interactive session; starting an application within the remote desktop session 165; the interaction of a user with a particular application, for instance, the application 160, during an established per-application session through the remote desktop session 165; and receiving the desktop session at the submission node 105.

As further shown in FIG. 2, one or more batch jobs, such as the batch job 135, may be executed simultaneously with one or more applications launched during an interactive session, such as the application 160, on the same compute node, for example, the compute node 120A. One or more criteria may be utilized in determining which compute node 120A, 120N, etc., to assign the batch job 135. For example, determining where to assign the batch job 135 may require an evaluation of available computer resources at each compute node 120A, 120N, etc. For example, an evaluation may be performed of at least one of required CPU, unutilized CPU, processor type, processor speed, and memory requirements of each compute node 120A, 120N, etc.

Figure 3:
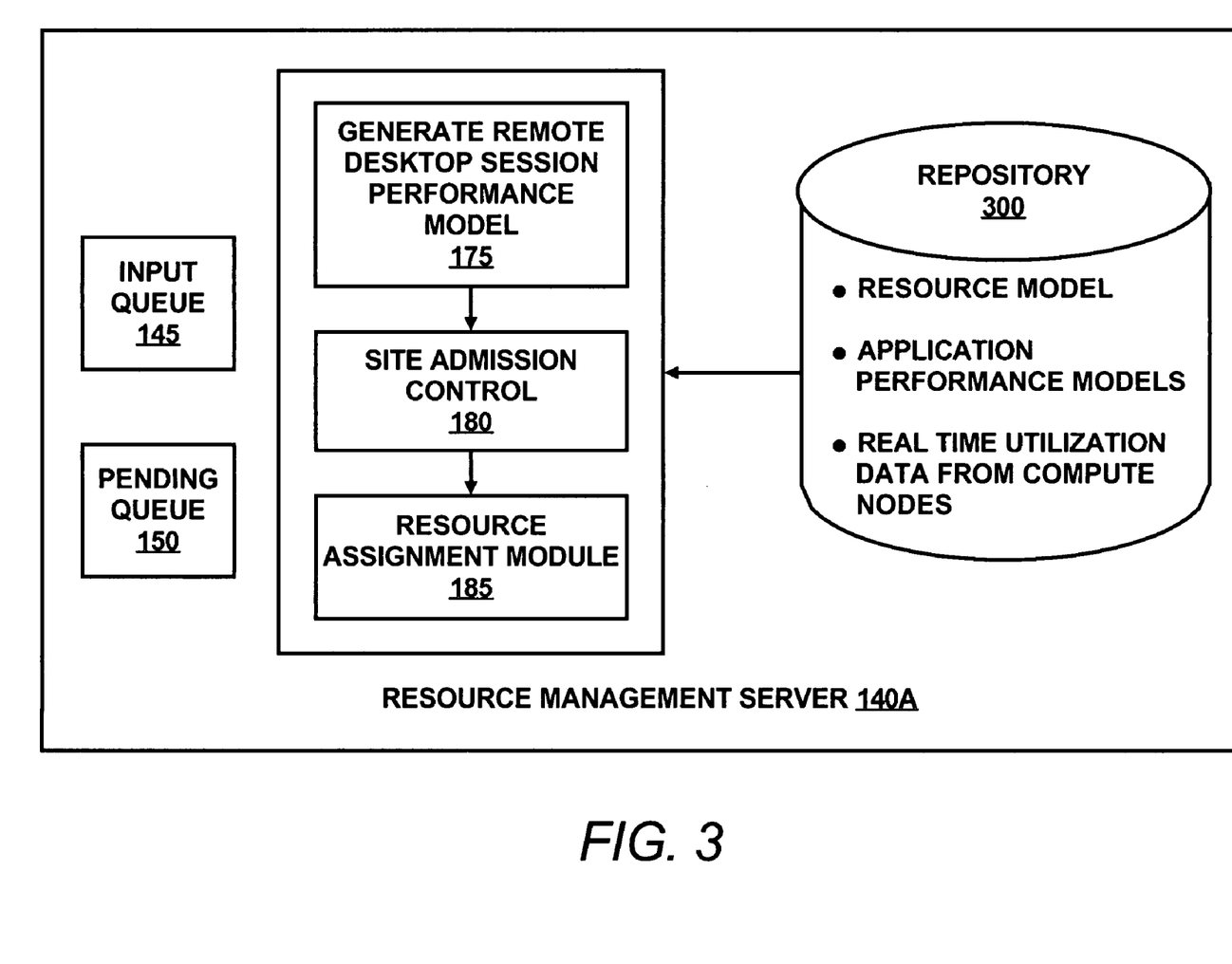
FIG. 3 depicts a resource management server, according to an embodiment.

Referring to FIG. 3, further detail is shown and described with regard to the architecture of the resource management server 140A. As described in detail with reference to FIG. 1, the resource management server 140A may include an input queue 145, a pending queue 150, a site admission control module 180, and a resource assignment module 185. In addition, the resource management server 140A may include an architecture for generating a remote desktop session performance model 175. The remote desktop session performance model 175 may be used to provide input to the site admission control module 180 and the resource assignment module 185.

The remote desktop session performance model 175 may be used to determine the computing requirements for a remote desktop session, such as the remote desktop session 165 shown and described with reference to FIG. 2. For purposes of creating the remote desktop session performance model 175, the remote desktop session 165 may include a remote display server and one or more application processes, such as the application 160. For example, a Virtual Network Computing (VNC) remote desktop session may include a VNC remote display server and one or more applications running in the context of the particular VNC desktop session. A VNC remote desktop session may comprise one or more remote desktop protocols that allow a user to remotely control another computer. The VNC remote desktop protocols may allow a user to transmit local computer operations, such as screen, keyboard and mouse operations, between terminals or computers on a network. A VNC remote desktop session may also include more than one VNC remote display server operating within a virtualized network. All applications running within a remote desktop session, for instance the remote desktop session 165, which are started interactively by an end-user, share the resources allocated to the remote desktop session in which the applications are executed.

The remote desktop session performance model 175 is generated for each user request. The remote desktop session performance model 175 may depend on one or both of the order of execution of applications running within the remote desktop session 165, and the number of instances of running each application during a runtime of the remote desktop session 165. In addition, the remote desktop session performance model 175 may be constructed based on information from one or more application performance models for the applications to be executed within the particular remote desktop session.

One or more application performance models may be hosted by a repository 300, as shown in FIG. 3. An application performance model may be used to describe the resource requirements for a specific application, such as the interactive application 160, to run at an acceptable Quality of Service (QoS) level. Resource requirements may include, for example, one or more of CPU utilization, network bandwidth, storage bandwidth, and network latency that are desired by a user, or needed for QoS requirements, for running the application 160.

An application performance model may be constructed offline by a system administrator. The application performance model may also be entered into one or more repositories, such as the repository 300, for access by one or more resource management servers, for example, the resource management server 140A.

In one embodiment, an application performance model may be constructed using one or more application profiles. Application profiling may be performed, for example, by executing an application, such as the interactive application 160, in isolation on a standard platform and applying a workload to the application 160. The resource consumption of the application 160 may be continuously monitored, in one example, over an entire period of executing the application 160. Statistical techniques may be applied to analyze the requirements for resource allocation to achieve acceptable execution of the application 160, for instance, to run the application 160 at an acceptable Quality of Service (QoS) level. In addition, the behavior of a particular end-user, or the aggregate behaviors of a number of end-users, may be modeled during the profiling of the application 160. For example, different states may be used to capture user interactions with interactive applications. Markov chains may also be used to model probabilistic transitions to better model the behavior of an end-user, or to model the aggregate behaviors of a number of end-users. In addition to the resource requirements of the application 160, the resource consumption of the remote display server may also be evaluated in generating the application performance model.

Referring to FIG. 3, the resource management server 140A may host the repository 300 which may be utilized in determining allocation of resources within a corresponding site, for instance, the site 115A, in response to an end-user request for a global interactive session. In addition to one or more application performance models, as described above, the repository 300, which may be accessible by the resource management server 140A, may also include one or more of a resource model and real-time utilization data from each compute node within the corresponding site 115A.

The resource model, hosted within the repository 300, may be used to capture at least one static characteristic of each compute node of a plurality of compute nodes 120A, 120N, etc. Examples of static characteristics of each compute node include, for example, the maximum CPU of each compute node and the memory capacity of each compute node.

With reference to FIG. 3, resources may be allocated by the resource management server at each site, for instance, by the resource management server 140A at the corresponding site 115A, based on the aggregate resource requirements for executing each global interactive session. The aggregate resource requirements may be determined based on one or more considerations including, for example, information from one or more application performance models, and one or more resource models.

Figure 4:
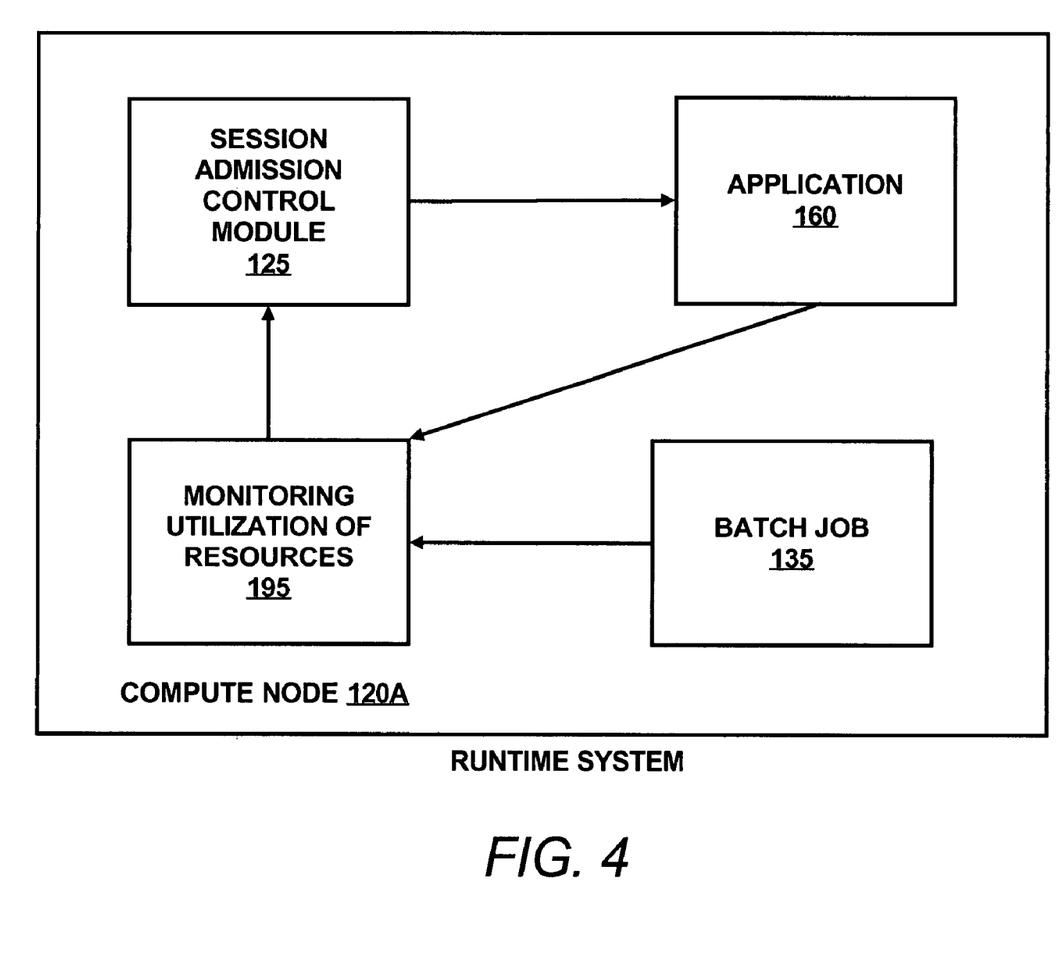
FIG. 4 depicts a runtime system environment, according to an embodiment.

Referring to FIG. 4, an example of a runtime system for the compute node 120A is shown. The components of the runtime system are responsible for resource allocation at runtime. As described above, with reference to FIGS. 1-3, an end-user may interactively start one or more applications throughout the lifecycle of the remote desktop session 165. Thus, resource allocation also depends on the resources utilized, in addition to the resources required, for a particular runtime during the remote desktop session 165. Within the runtime system, the session admission control module 125 operates for every executing remote desktop session, such as the remote desktop session 165.

Once the remote desktop session 165 is started, the session admission control module 125 operates to receive and filter requests from the end-user for starting new applications within the remote desktop session 165, considering the requirements for each application as described in detail above, including information from the application performance models for each application. The session admission control module 125 may permit an end-user to start, for example, the application 160. Thus, the session admission control module 125 may receive input on the resource requirements and status for each application. In addition, the session admission control module 125 of the compute node 120A may receive continuous input with regard to the utilization of resources 195 for each interactive application, such as the application 160, and each batch job, such as the batch job 135.

Figure 5A:
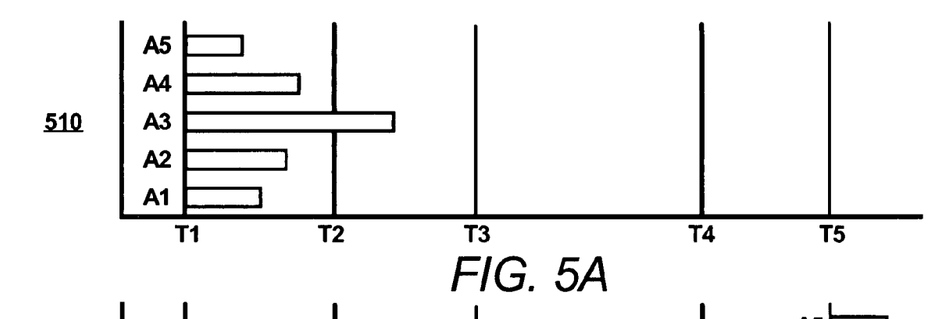
FIG. 5A depicts an example of a simultaneous execution order of applications within an interactive session at a site level, according to an embodiment.

Referring to FIG. 5A, the graph 510 depicts an example of resource requirements for a remote desktop session, such as the remote desktop session 165, in which there is simultaneous execution of five applications (A1-A5) at time interval T1. In the case of simultaneous execution, the aggregate resource requirements for the remote desktop session may be modeled as the sum of the individual resource requirements for each of the applications A1 through A5. One or more batch jobs may be executed simultaneously with one or more interactive sessions on the same compute node or different compute nodes.

Figure 5B:
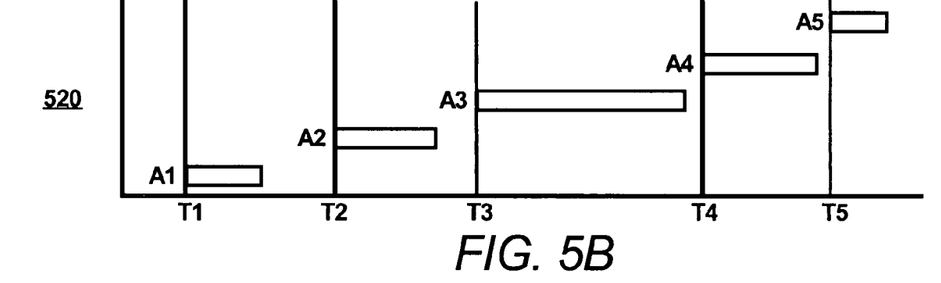
FIG. 5B depicts an example of a sequential execution order of applications within an interactive session at a site level, according to an embodiment.

Referring to FIG. 5B, the graph 520 depicts an example of resource requirements for a remote desktop session, such as the remote desktop session 165, in which there is sequential execution of the five applications (A1-A5). As depicted in graph 520, application A1 is executed at time interval T1, application A2 is executed at time interval T2, and so forth in a sequential manner. In the case of sequential execution of the applications A1 through A5, the aggregate resource requirements for the remote desktop session may be modeled as the maximum of the individual resource requirements for each of the applications A1 through A5. One or more batch jobs may be executed simultaneously with one or more interactive sessions on the same compute node or different compute nodes.

Figure 5C:
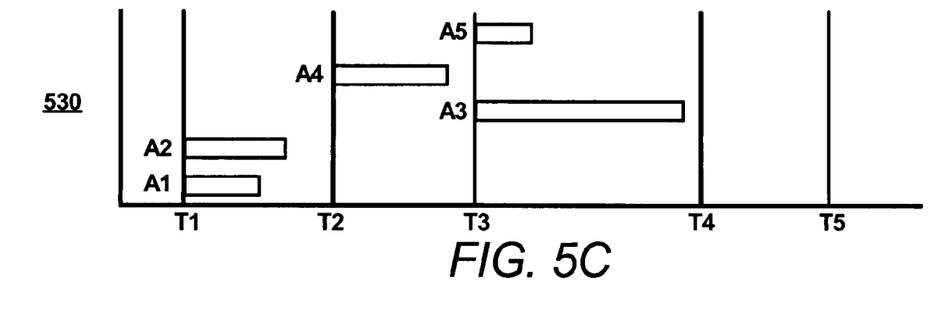
FIG. 5C depicts an example of a mixed execution order of applications within an interactive session at a site level, according to an embodiment.

Referring to FIG. 5C, the graph 530 depicts an example of resource requirements for a remote desktop session, such as the remote desktop session 165, in which there is mixed execution of the five applications (A1-A5). Although the applications A1 through A5 are shown as executing at particular time intervals between T1 through T5, wherein some applications are executed simultaneously, and other applications are executed sequentially, the order of execution of the applications in the case of mixed execution may be varied. In the case of mixed execution, as depicted in the graph 530, the aggregate resource requirements may be modeled, in one example, as a value based on historical-based prediction between the values for simultaneous execution, as in the case of graph 510, and sequential execution, as in the case of graph 520. With mixed-order execution, as in the example shown in graph 530, the aggregate resource requirement may also be negotiated with an end-user. One or more batch jobs may be executed simultaneously with one or more interactive sessions on the same compute node or different compute nodes.

Figure 6:
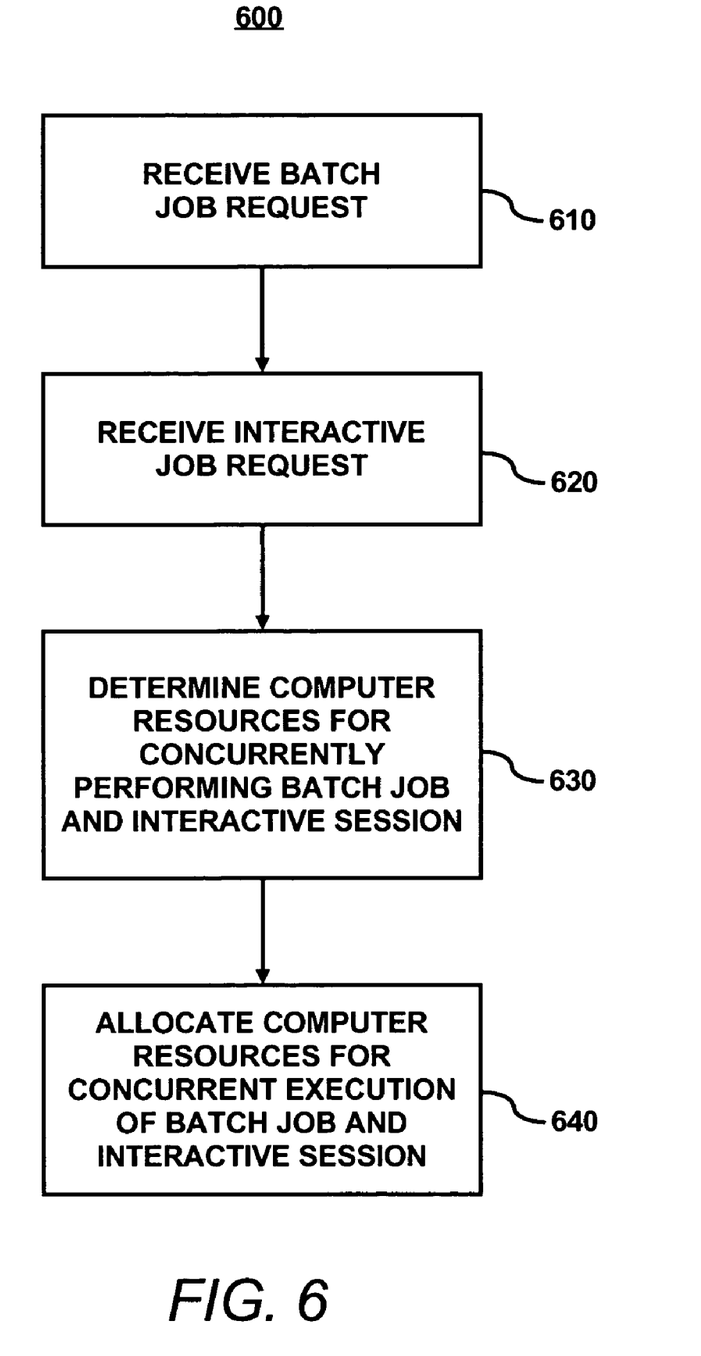
FIG. 6 depicts a flowchart of a method for allocating grid computer resources, according to an embodiment.

Referring to FIG. 6, a flowchart depicts a method of allocating resources in a grid computing environment. At step 610, a grid computer system 100 may receive at least one request for a batch job. The characteristics of a batch job, such as the batch job 135 shown in FIG. 2, are described above in detail. At step 620, the system may receive at least one request for an interactive session from an end-user. As discussed above, with reference to FIGS. 1 and 2, a request may be submitted by an end-user either directly to one of a plurality of sites 115A-115X, or indirectly through a grid super scheduler 110. At step 630, information on resource requirements and resource utilization are used in determining the computer resources required for concurrently executing the at least one batch job and the at least one interactive session.

At step 640, the system 100 may be utilized in allocating the grid computer resources required for concurrently executing at least one batch job and the at least one interactive session. Allocating computer resources includes matching available computer resources with the computer resource requirements determined at step 630. An available computer resource includes a computer resource that can execute, for example, a batch job or an interactive session, when needed. This may be a computer resource currently not being used or a computer resource that is known to soon become available. In one embodiment, one pool of resources may be allocated for an interactive remote desktop session, and a separate pool of resources may be allocated for a batch job. In another embodiment, the same pool of resources may be allocated for concurrently executing a batch job and an interactive session on the same machine. Grid computer resources may thus be allocated to satisfy the computing needs, or computing requirements, for concurrently executing a batch job and an interactive session. In addition, allocation of computer resources may utilize a least loaded algorithm for determining allocation of resources for executing a batch job.

A multiple variable best fit algorithm may be utilized for determining allocation of grid computer resources for executing one or more remote desktop sessions 165. Multiple variables, such as network bandwidth and storage bandwidth, may be considered by the multiple variable best fit algorithm for determining resource allocation. The multiple variable best fit algorithm may also take other resource requirement heuristics into consideration for resource assignment. The compute nodes 120A-120N satisfying the resource requirements are considered for resource assignment. Resource assignment may also include simultaneous allocation of multiple remote desktop sessions 165 on a single compute node, such as the compute node 120A.

In allocating grid computer resources for executing a remote desktop session 165, the multiple variable best fit algorithm may assign the remote desktop session 165 to the compute nodes 120A-120N in a manner that reduces fragmentation. By reducing or minimizing fragmentation, the multiple variable best fit algorithm may be used to assign a greater number of remote desktop sessions, including the remote desktop session 165, to the compute nodes 120A-120N and thus reduce the wait time for requests in the pending queue 150.

The multiple variable best fit algorithm may also perform weighted best fitting in determining resource allocation for executing the remote desktop session 165. In one example, a user may submit a request for running the remote desktop session 165. For each compute node 120A-120N that satisfies the resource requirements for the user's request, the multiple variable best fit algorithm determines the available resources, including the available CPU, network bandwidth and storage bandwidth. The multiple variable best fit algorithm also determines the difference, or delta value, between the available resources of each compute node 120A-120N and the required resources for executing the user's requested remote desktop session.

After determining each delta value, the multiple variable best fit algorithm may assign a weight function for each resource, including the CPU, network bandwidth and storage bandwidth, for each compute node. Each weight function may be assigned in a manner that is inversely proportional to the corresponding delta value. For instance, the weight function assigned for the CPU resource for the compute node 120A may be inversely proportional to the delta value for the CPU resource for the compute node 120A. Based on the assigned weight functions for each resource, the multiple variable best fit algorithm may then aggregate each of the assigned weight functions for each of the compute nodes 120A-120N. The compute node 120A-120N having the highest aggregate weight function may be selected for executing the user's requested remote desktop session. In a case in which more than one compute node 120A-120N has the same aggregate weight function, the compute node 120A-120N with the least load may be selected for executing the session, where load is measured in terms of CPU utilization. The multiple variable best fit algorithm may also utilize information obtained from the remote desktop session performance model 175 in determining grid computer resource allocation.

In determining grid computer resource allocation, one or more of the resources may be considered bottleneck resource variables. The weight assignments may be adjusted by the multiple variable best fit algorithm to account for the bottleneck resource variables. For instance, for a computer-aided design (CAD) session, the CPU requirement may be considered the bottleneck resource variable. Thus, to allocate resources for the CAD session, the multiple variable best fit algorithm may assign a greater weight to the CPU utilization. In another example, in the case of computer applications for performing financial transactions, storage bandwidth may be considered the bottleneck resource variable. For office applications, network latency may be considered the bottleneck resource variable. In each case, the multiple variable best fit algorithm may adjust one or more weight assignments in determining resource allocation for executing a particular type of application.

Figure 7:
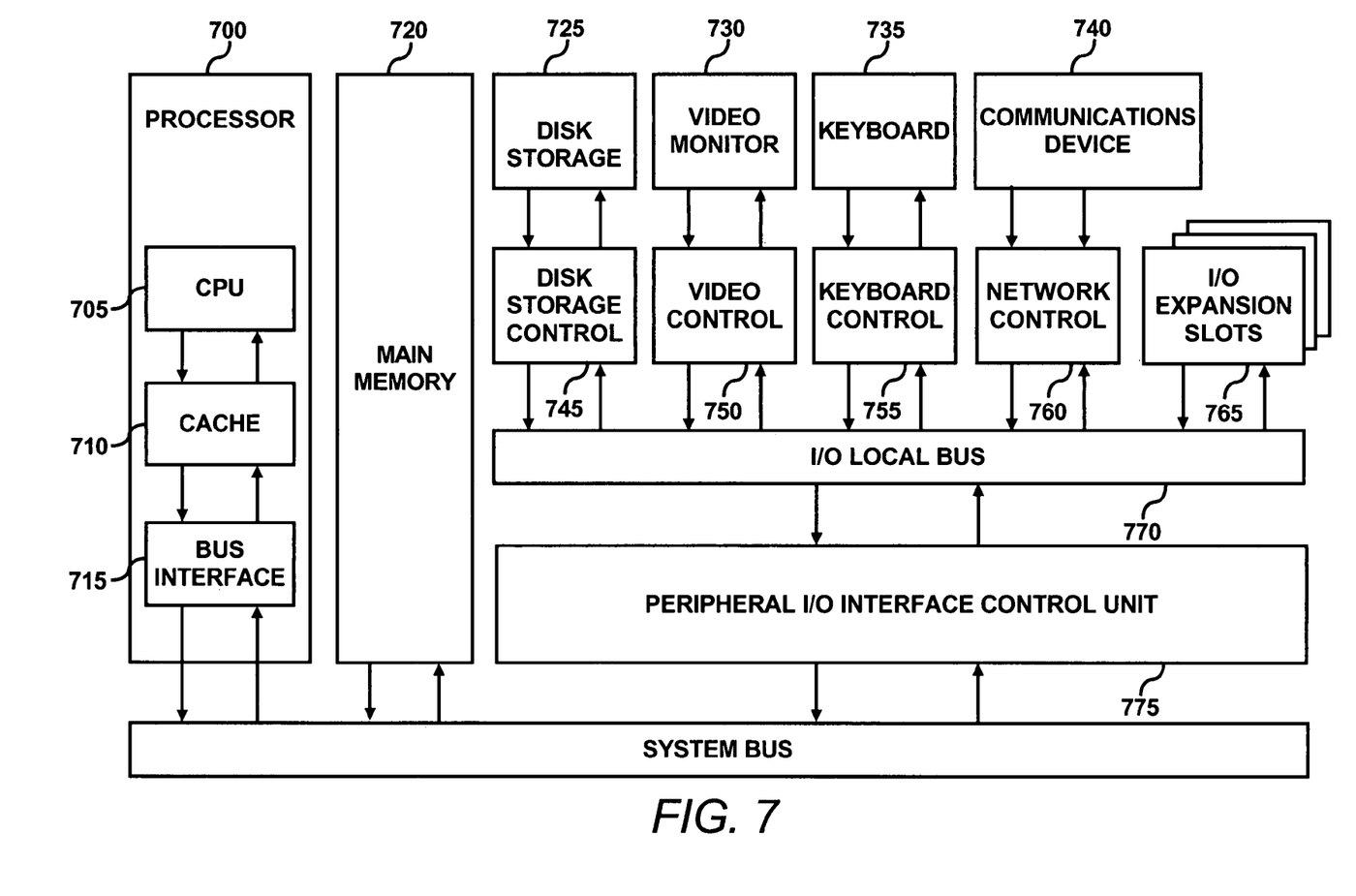
FIG. 7 depicts an example of a computer system for use in a grid computing environment, according to an embodiment.

Referring to FIG. 7, a block diagram of an example architecture is shown for a general purpose computer suitable for executing the functions of one or more components of the grid computing system 100. The illustrated general purpose computer may also be suitable for running other network applications. At least one microprocessor 700, including a central processing unit (CPU) 705, a memory cache 710, and a bus interface 715, is operatively coupled via a system bus 780 to a main memory 720 and an Input/Output (I/O) control unit 775. The I/O interface control unit 775 is operatively coupled via an I/O local bus 770 to a disk storage controller 745, a video controller 750, a keyboard controller 875, a network controller 760, and I/O expansion slots 765.

The disk storage controller 745 is operatively coupled to the disk storage device 725. The video controller is operatively coupled to the video monitor 730. The keyboard controller 755 is operatively coupled to the keyboard 735. The network controller 760 is operatively coupled to the communications device 740. The communications device 740 is adapted to allow the network inventory adapter operating on the general purpose computer to communicate with a communications network, such as the Internet, a Local Area Network (LAN), a Wide Area Network (WAN), a virtual private network, or a middleware bus, or with other software objects over the communications network.

Computer program instructions for implementing the grid computing system may be stored on the disk storage device 725 until the processor 700 retrieves the computer program instructions, either in full or in part, and stores them in the main memory 720. The processor 700 then executes the computer program instructions stored in the main memory 720 to implement the features of grid computing system. The program instructions may be executed with a multiprocessor computer having more than one processor.

The general purpose computer illustrated in FIG. 7 is an example of a device suitable for executing the various functions of the grid computing system 100. The grid computing system 100, and any other associated programs, applications, components, and operations, may also run on a plurality of computers, a network server, or other suitable computers and devices.

What has been described and illustrated herein are embodiments along with some variations. While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A method of allocating resources in a grid computing environment, comprising:
    receiving at least one request for a batch job;
    receiving at least one request for an interactive session;
    determining, by at least one hardware processing unit, computer resources needed for concurrently executing the batch job and the interactive session;
    allocating the computer resources for concurrently executing both the batch job and the interactive session, wherein the allocating includes using a multivariable best fit algorithm to allocate the computer resources to reduce fragmentation among the computer resources;
    evaluating resource requirements for admitting an application session established through the interactive session, wherein the evaluating includes predicting resource requirements for the application session; and
    admitting the application session in response to the resource requirements for the application session being available.

2. The method of claim 1, wherein determining computer resources needed for concurrently executing the batch job and the interactive session further comprises:
    determining computing requirements for the batch job and the interactive session; and
    selecting available computer resources from a pool of resources operable to satisfy the computing requirements for the batch job and the interactive session.

3. The method of claim 2, wherein the pool of computer resources are provided in a single data center.

4. The method of claim 2, wherein the pool of computer resources are provided in a plurality of data centers.

5. The method of claim 4, wherein the plurality of data centers comprises data centers provided within a grid computing environment.

6. The method of claim 4, wherein the pool of computer resources provided in the plurality of data centers comprises heterogeneous resources.

7. The method of claim 4, wherein the pool of computer resources provided in the plurality of data centers comprises geographically distributed resources.

8. The method of claim 4, wherein the pool of computer resources provided in the plurality of data centers comprises shared resources.

9. The method of claim 1, wherein determining computer resources needed for executing the interactive session comprises evaluating at least one of a static resource requirement of a compute node, network bandwidth requirements, required CPU cycles, unutilized CPU cycles, a resource requirement by a user, at least one authorization policy to identify resources which the user is authorized to use, and other performance criteria.

10. The method of claim 9, wherein the at least one static resource requirement comprises processor speed, processor type, and memory size.

11. The method of claim 9, wherein the resource requirement by a user comprises at least one of a type of operating system, protocol requirements, session duration requirements, and security requirements.

12. The method of claim 1, wherein allocating the computer resources comprises allocating the computer resources utilizing a least loaded algorithm.

13. The method of claim 1, wherein allocating the computer resources utilizing a multiple variable best fit algorithm further comprises:
    performing weighted best fitting to allocate the computer resources.

14. The method of claim 1, wherein allocating the computer resources further comprises allocating a compute node for the interactive session.

15. The method of claim 1, further comprising executing the batch job on one compute node and concurrently executing the interactive session on the same compute node.

16. The method of claim 1, further comprising executing the batch job on one compute node and concurrently executing the interactive session on another compute node.

17. The method of claim 1, further comprising executing the interactive session as a remote desktop session.

18. The method of claim 1, further comprising executing the remote desktop session in a virtual network computing environment.

19. A system for allocation of resources, comprising:
    means for receiving an interactive session request;
    means for receiving a batch job request;
    means for determining computing requirements for the interactive session request;
    means for determining computing requirements for the batch job request;
    means for allocating computer resources for concurrently executing the batch job and the interactive session based on determined computing requirements for the batch job and the interactive session, wherein the allocating includes using a multivariable best fit algorithm to allocate the computer resources to reduce fragmentation among the computer resources;
    means for evaluating resource requirements for admitting an application session established through the interactive session, wherein the evaluating includes predicting resource requirements for the application session; and
    means for admitting the application session in response to the resource requirements for the application session being available.

20. The system of claim 19, wherein the means for selecting utilizes at least one of an application performance model, a remote desktop session performance model, a resource model, and real-time utilization data from each compute node of a plurality of compute nodes.

21. A non-transitory computer storage medium on which is embedded one or more computer programs, said one or more computer programs, when executed by a computer system, implementing a method of allocating resources in a grid computing environment, the method comprising:
    receiving a request for a batch job;
    receiving a request for an interactive session;
    determining computer resources needed to satisfy computing requirements for concurrently executing the batch job and the interactive session;
    allocating the computer resources for concurrently executing both the batch job and the interactive session, wherein the allocating includes using a multivariable best fit algorithm to allocate the computer resources to reduce fragmentation among the computer resources;
    evaluating resource requirements for admitting an application session established through the interactive session, wherein the evaluating includes predicting resource requirements for the application session; and
    admitting the application session in response to the resource requirements for the application session being available.

\* \* \* \* \*